(12) United States Patent
Akama

(10) Patent No.: US 8,411,397 B2
(45) Date of Patent: Apr. 2, 2013

(54) POWER SUPPLY APPARATUS AND METHOD

(75) Inventor: Hiroshi Akama, Miyagi (JP)

(73) Assignee: Sony Corporation (JP)

( * ) Notice: Subject to any disclaimer, the term of this patent is extended or adjusted under 35 U.S.C. 154(b) by 379 days.

(21) Appl. No.: 12/831,387

(22) Filed: Jul. 7, 2010

(65) Prior Publication Data
US 2011/0019322 A1  Jan. 27, 2011

(30) Foreign Application Priority Data

Jul. 22, 2009 (JP) .............................. P2009-170785

(51) Int. Cl.
*H02H 7/00* (2006.01)
*H02H 9/00* (2006.01)
*H02H 7/10* (2006.01)
(52) U.S. Cl. ........................................... 361/18; 363/50
(58) Field of Classification Search .................... 361/18; 363/50
See application file for complete search history.

(56) References Cited

U.S. PATENT DOCUMENTS 6,480,043 B2 * 11/2002 Hall et al. ..................... 327/108
7,440,297 B2 * 10/2008 Adragna et al. ................ 363/50

FOREIGN PATENT DOCUMENTS

JP 11-164548 6/1999

* cited by examiner

Primary Examiner — Jared Fureman
Assistant Examiner — Lucy Thomas
(74) Attorney, Agent, or Firm — Sheridan Ross P.C.

(57) ABSTRACT

A power supply apparatus and method are provided. A conversion component outputs a first current having a predetermined phase region, an output component outputs a load voltage, a sense component senses a second current value, and a switch element allows current to flow in a first state and impedes current in a second state. The switch element changes between states based on a drive signal forcing the switch into the second state when the first current is in the predetermined phase region and the second current value exceeds a threshold indicating an overcurrent condition. A region determination circuit determines whether the first current is in the predetermined phase region and produces a phase region signal. An overcurrent detection circuit senses the second current value, determines whether it exceeds an overcurrent condition threshold, and produces an overcurrent signal. A protection circuit causes the drive circuit to switch the drive signal.

33 Claims, 10 Drawing Sheets

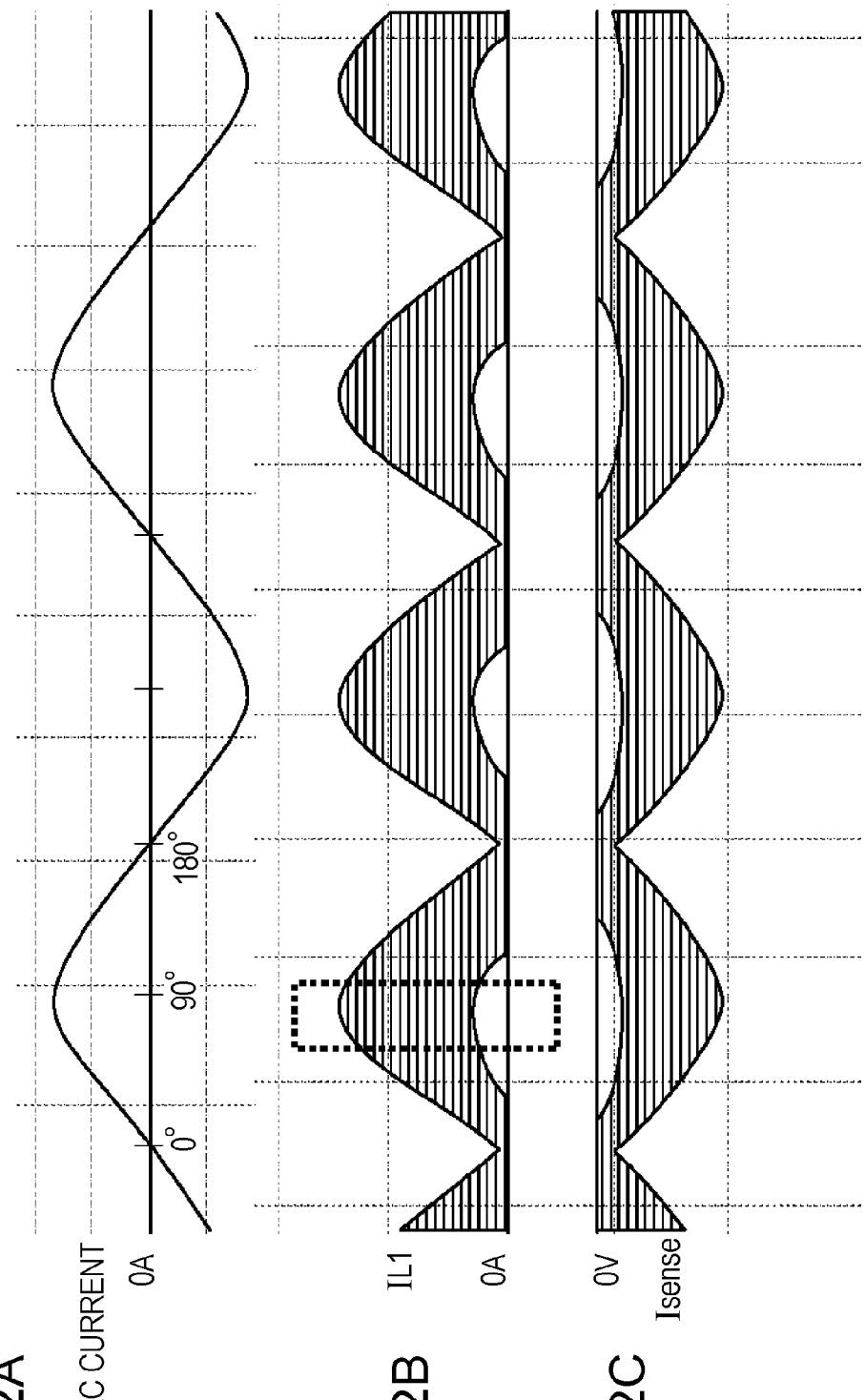

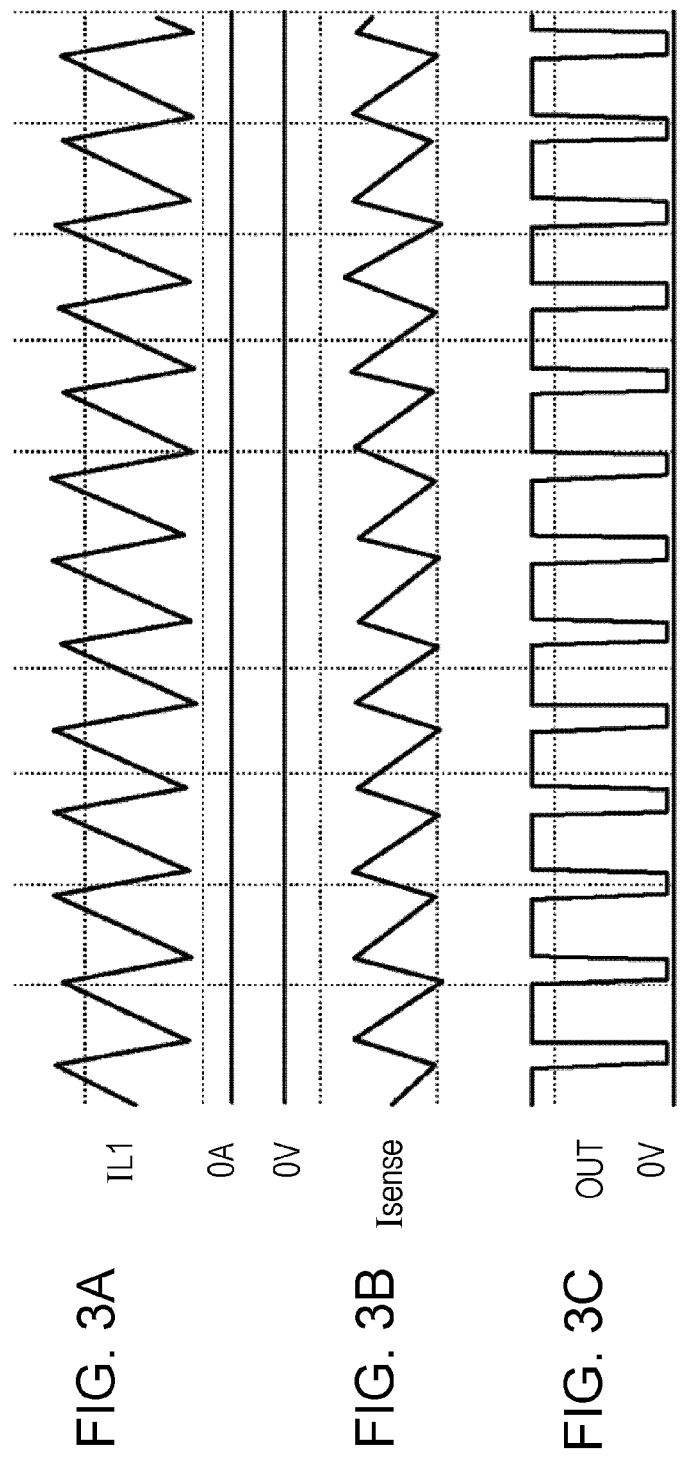

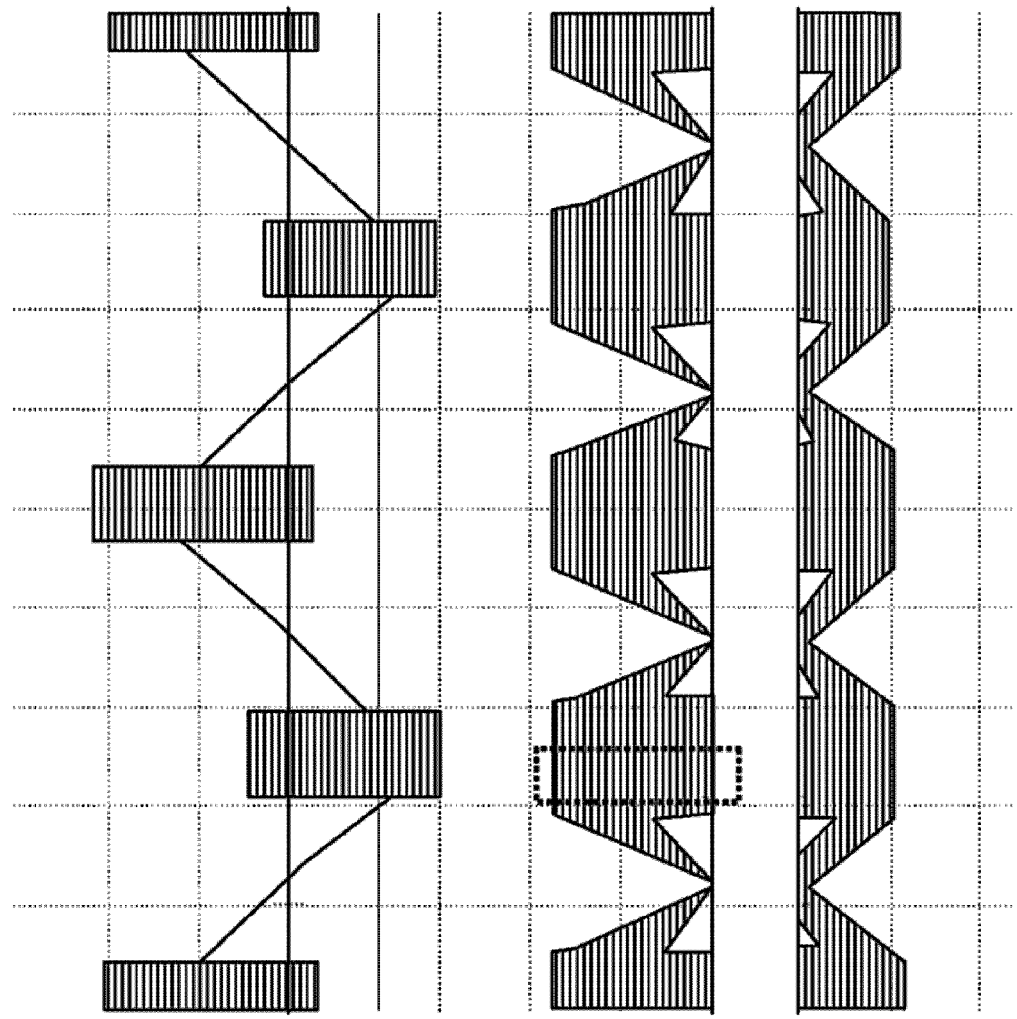

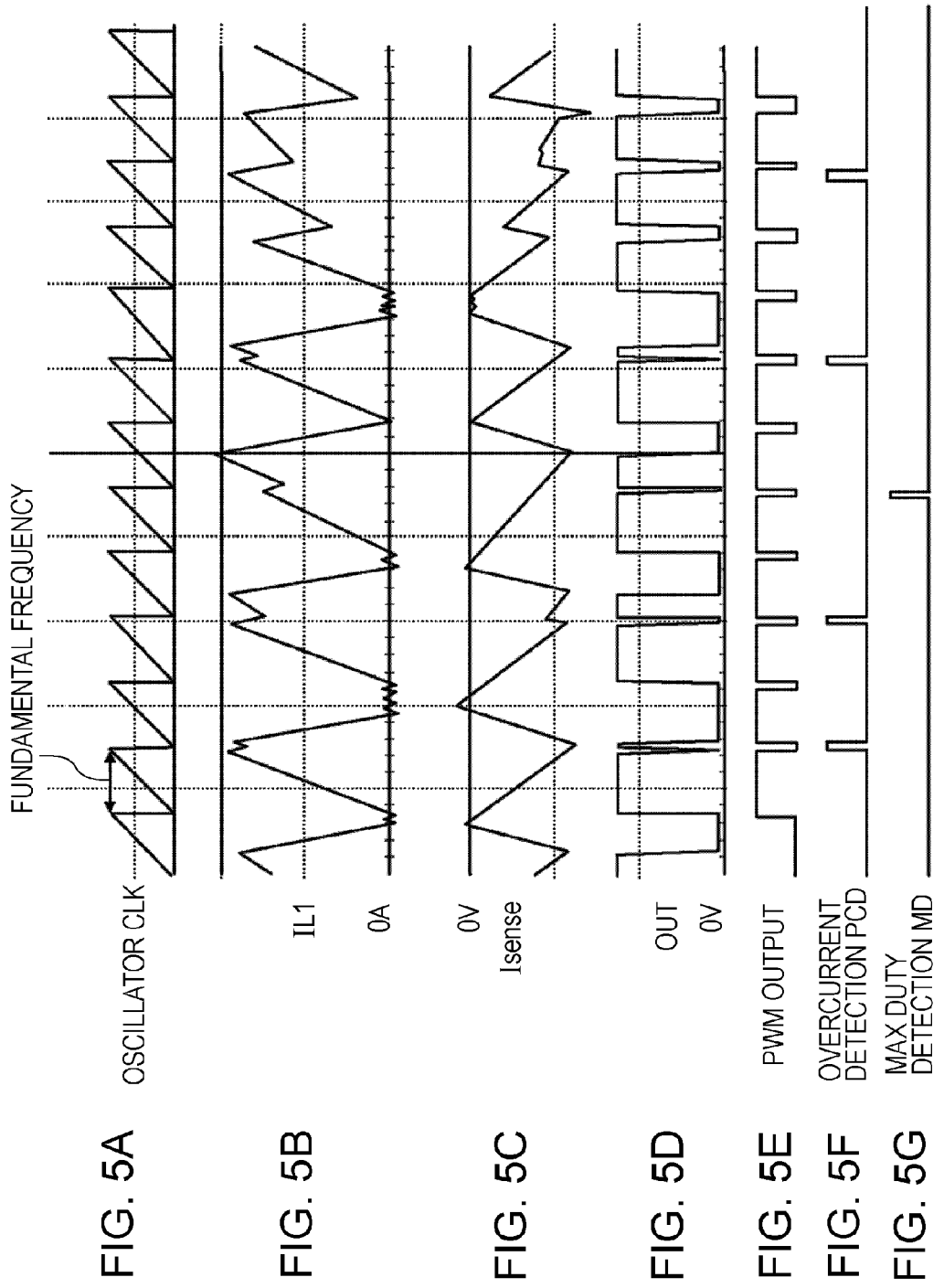

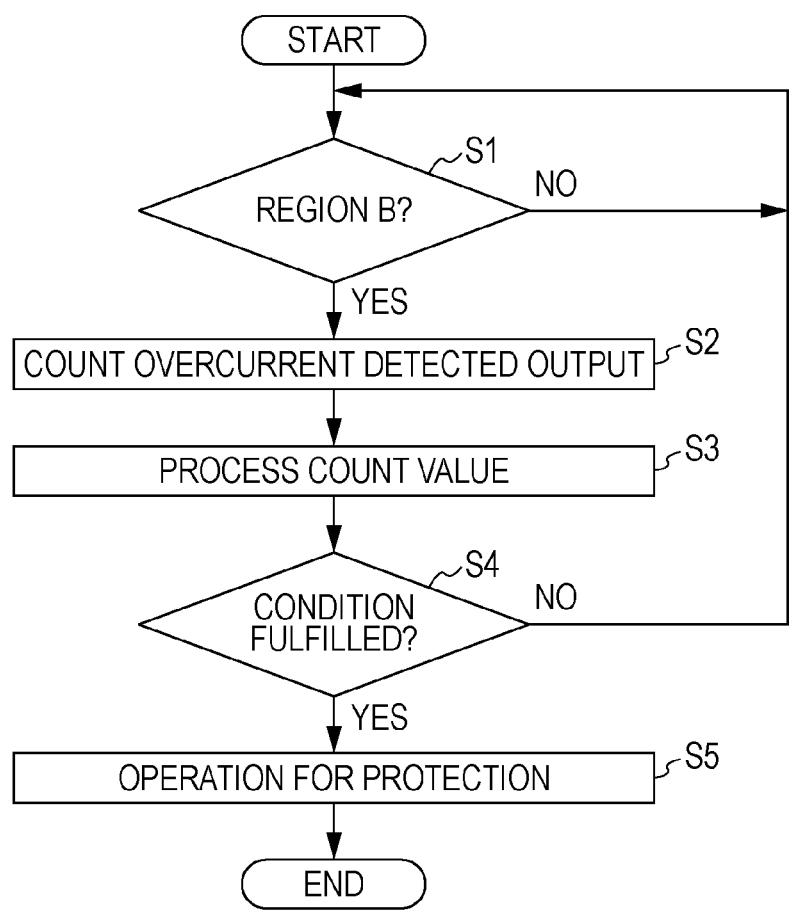

POWER SUPPLY APPARATUS AND METHOD

CROSS REFERENCES TO RELATED APPLICATIONS

The present application claims priority to Japanese Priority Patent Application JP 2009-170785 filed in the Japan Patent Office on Jul. 22, 2009, the entire content of which is hereby incorporated by reference.

BACKGROUND

The present disclosure relates to a power supply device that generates a stable direct current voltage by rectifying an alternating current, and in particular, to a power supply device having a PFC control circuit.

Power supply devices having a PFC (power factor correction) control IC (integrated circuit) can suppress occurrence of harmonics by improving the power factor. As such a power supply device, there is a power supply device described in Japanese Unexamined Patent Application Publication No. 11-164548.

The power supply device described in Japanese Unexamined Patent Application Publication No. 11-164548 is designed to prevent an excessive current from flowing in a capacitor and a switching element from being broken due to the excessive current upon activation and a rapid rise of an input voltage when returning from an instantaneous interrupt (instantaneous stoppage of alternating current power supply) of the alternating current power supply. In Japanese Unexamined Patent Application Publication No. 11-164548, a current flows in a sensing resistor to compare the detected voltage with a reference value, and when an excessive current is detected, an output of a drive pulse to the switching element is stopped.

Typically, overcurrent limiting circuits in the past are designed to operate upon activation, overload, an abrupt change in the load, instantaneous interruption of alternating current power supply, a decrease in the voltage of alternating current power supply, and the like. In the configuration in the past, an overcurrent is commonly limited near a phase angle of 90° of the alternating current power supply, where the peak value of the current flowing in a choke coil is high. However, in a case of carrying out an abnormal condition test, the function of overcurrent limitation may not work. In that case, an overcurrent condition may occur near a phase angle from, for example, 30° to 40° of the alternating current power supply, and a problem of an increase in loss occurs, which leads to a problem of increasing electrical stress to semiconductors, such as a switching element.

In the past, for an overcurrent in such an abnormal condition, heat generation due to an increase in loss of semiconductors, such as a switching element, used to be sensed by a temperature element, and when the temperature became at a predetermined value or higher, the operation has been stopped. This method is problematic because electrical stress has been applied to a semiconductor during a period until overheating. Further, this method may not stop the operation with an increase in loss at a level not sensed as an overheat.

Accordingly, it is desirable to provide a power supply device that can carry out protection during such an abnormal condition test more securely compared to heat generation sensing.

SUMMARY

According to an example embodiment of the present disclosure, a power supply apparatus for converting an alternating current to a direct current includes a conversion component outputting a variable first voltage, the first voltage causing a first current, the first current having a predetermined phase region defined by at least one phase angle range of a waveform of the first current, an output component operably coupled to the conversion component, the output component outputting a load voltage, a sense component operably coupled to the conversion component, the sense component sensing a value indicative of a second current, and a switch element operably coupled to the conversion component, the switch element having a first state and a second state, wherein the switch element allows current to flow through the switch element in the first state and impedes current from flowing through the switch element in the second state wherein the switch element changes between the first state and the second state based on a switch drive signal, wherein the switch drive signal forces the switch into the second state when the first current is determined to be in the predetermined phase region and the value indicative of the second current exceeds a threshold indicative of an overcurrent condition through the switch element.

Further, according to an example embodiment of the present disclosure, the conversion component is a full wave rectifier.

Further, according to an example embodiment of the present disclosure, the predetermined phase region is at least one of 0 to 80 degrees and 100 to 180 degrees.

Further, according to an example embodiment of the present disclosure, the predetermined phase region is at least one of 30 to 40 degrees and 140 to 150 degrees.

Further, according to an example embodiment of the present disclosure, the first current is determined to be in the predetermined phase region by using a ratio of the first current to an average of the first voltage.

Further, according to an example embodiment of the present disclosure, the output component is a capacitor.

Further, according to an example embodiment of the present disclosure, the switch element is a field effect transistor.

Further, according to an example embodiment of the present disclosure, the sense component is a resistor and the second current flows only through the switch element and the sense component when the switch element is in the first state.

Further, according to an example embodiment of the present disclosure, the power supply apparatus further comprises an alternating current voltage source operably coupled to the conversion component.

Further, according to an example embodiment of the present disclosure, the power supply apparatus further comprises a load device which receives the load voltage from the output component.

Further, according to an example embodiment of the present disclosure, the load device is at least one of a laptop computer, a mobile phone, a digital camera, and a tablet computer.

According to an example embodiment of the present disclosure, a power supply apparatus for converting an alternating current to a direct current includes a region determination circuit receiving a signal indicative of a first current output by a conversion component to determine whether the first current is in a predetermined phase region defined by at least one phase angle range of a waveform of the first current, the region determination circuit producing a phase region signal when the first current is in the predetermined phase region, an overcurrent detection circuit sensing a value indicative of a second current and determining whether the value indicative of the second current exceeds a threshold indicative of an overcurrent condition through a switch element, the overcurrent detection circuit producing an overcurrent signal when the second current exceeds the threshold; a drive circuit causing the switch element to switch between a first state, which allows current to flow through the switch element, and a second state, which impedes current from flowing through the switch element, and a protection circuit operably coupled to the region determination circuit to receive the phase region signal and operably coupled to the overcurrent detection circuit to receive the overcurrent signal, the protection circuit causing the drive circuit to switch the switch element to the second state when the phase region signal and the overcurrent signal indicate that at least one overcurrent condition occurred while the first current was in the predetermined phase region.

Further, according to an example embodiment of the present disclosure, the power supply apparatus of the predetermined phase region is at least one of 0 to 80 degrees and 100 to 180 degrees.

Further, according to an example embodiment of the present disclosure, the power supply apparatus of the predetermined phase region is at least one of 30 to 40 degrees and 140 to 150 degrees.

Further, according to an example embodiment of the present disclosure, the power supply apparatus comprises a counter which increments based on detecting a first predetermined number of overcurrent conditions while the first current is in the predetermined phase region during a second predetermined number of wave periods.

Further, according to an example embodiment of the present disclosure, the power supply apparatus of the counter is at least one of reset and counted down based on detecting less than a third predetermined number of overcurrent conditions while the first current is in the predetermined phase region during a fourth predetermined number of wave periods.

Further, according to an example embodiment of the present disclosure, the power supply apparatus comprises a counter which increments based on detecting a first predetermined number of continuous overcurrent conditions while the first current is in the predetermined phase region during a second predetermined number of wave periods.

Further, according to an example embodiment of the present disclosure, the power supply apparatus of the counter is at least one of reset and counted down based on detecting less than a third predetermined number of continuous overcurrent conditions while the first current is in the predetermined phase region during a fourth predetermined number of wave periods.

Further, according to an example embodiment of the present disclosure, the power supply apparatus of the protection circuit causes the drive circuit to switch the switch element to the second state after receiving a first predetermined number of overcurrent signals while the first current was in the predetermined phase region during a second predetermined number of wave periods.

Further, according to an example embodiment of the present disclosure, the power supply apparatus of the protection circuit causes the drive circuit to switch the switch element to the second state after receiving a first predetermined number of overcurrent signals while the first current was in the predetermined phase region during a second predetermined number of consecutive wave periods.

Further, according to an example embodiment of the present disclosure, the power supply apparatus of the protection circuit causes the drive circuit to switch the switch element to the second state after receiving a first predetermined number of continuous overcurrent signals while the first current was in the predetermined phase region during a second predetermined number of wave periods.

Further, according to an example embodiment of the present disclosure, the power supply apparatus of the protection circuit causes the drive circuit to switch the switch element to the second state after receiving a first predetermined number of continuous overcurrent signals while the first current was in the predetermined phase region during a second predetermined number of consecutive wave periods.

Further, according to an example embodiment of the present disclosure, the power supply apparatus of the protection circuit causes the drive circuit to switch the switch element to the second state after receiving at least one of a first predetermined number of overcurrent signals and a second predetermined number of continuous overcurrent signals while the first current was in the predetermined phase region during a third predetermined number of wave periods of a fourth predetermined number of consecutive wave periods.

Further, according to an example embodiment of the present disclosure, the power supply apparatus of the protection circuit causes the drive circuit to switch the switch element to the second state based on a maximum duty signal for the switch element.

Further, according to an example embodiment of the present disclosure, the power supply apparatus of at least one of the overcurrent signal and the phase region signal is a binary signal.

Further, according to an example embodiment of the present disclosure, the power supply apparatus of the region determination circuit, the overcurrent detection circuit, the drive circuit, and the protection circuit are located on a single integrated circuit.

According to an example embodiment of the present disclosure, a method for converting an alternating current to a direct current for supplying power includes converting an alternating current input into a variable first voltage, the variable first voltage causing a first current, the first current having a predetermined phase region defined by at least one phase angle range of a waveform of the first current, producing a second voltage based on the first voltage, switching a switch element between a first state and a second state, sensing a value indicative of a second current caused by the second voltage, determining whether the value indicative of the second current exceeds a threshold indicative of an overcurrent condition through the switch element, and outputting a load voltage resulting from the second voltage and the switching of the switch element, wherein the switch element allows current to flow through the switch element in the first state and impedes current from flowing through the switch element in the second state, wherein the switch element changes between the first state and the second state based on a switch drive signal, wherein the switch drive signal forces the switch into the second state when the first current is determined to be in the predetermined phase region and the value indicative of the second current exceeds a threshold indicative of an overcurrent condition through the switch element.

Further, according to an example embodiment of the present disclosure, the method of the switch drive signal forces the switch into the second state after a first predetermined number of overcurrent conditions occur when the first current was in the predetermined phase region during a second predetermined number of wave periods.

Further, according to an example embodiment of the present disclosure, the method of the second current flows only through the switch element and a resistor when the switch element is in the first state.

Further, according to an example embodiment of the present disclosure, the method of the first current is determined to be in the predetermined phase region by using a ratio of the first current to an average of the first voltage.

According to an example embodiment of the present disclosure, a method for converting an alternating current to a direct current for supplying power, includes, receiving a signal indicative of a first current output by a conversion component to determine whether the first current is in a predetermined phase region defined by at least one phase angle range of a waveform of the first current, producing a phase region signal when the first current is in the predetermined phase region, sensing a value indicative of a second current, determining whether the value indicative of the second current exceeds a threshold indicative of an overcurrent condition through a switch element, producing an overcurrent signal when the second current exceeds the threshold, and switching the switch element from a first state, which allows current to flow through the switch element, to a second state, which impedes current from flowing through the switch element, when the phase region signal and the overcurrent signal indicate that at least one overcurrent condition occurred while the first current was in the predetermined phase region.

Further, according to an example embodiment of the present disclosure, the method comprises counting overcurrent conditions while the first current is in the predetermined phase region during at least one wave period to determine when to switch the switch element to the second state.

Further, according to an example embodiment of the present disclosure, the method of the first current is determined to be in the predetermined phase region by using a ratio of the first current to an average of the first voltage.

According to such example embodiments of the present disclosure, even in a case of an overcurrent condition due to an abnormal operation because of an abnormal test or the like, a protective operation is carried out to protect a switching element and the like. In the example embodiments of the present disclosure, since a temporal delay does not occur compared with the method of carrying out a protective operation by detecting heat generation of the switching element, it is possible to securely carry out protection.

Additional features and advantages are described herein, and will be apparent from the following Detailed Description and the figures.

BRIEF DESCRIPTION OF THE FIGURES

FIGS. 2A through 2C are waveform charts illustrating example signal waveforms in some parts of the power supply device of the past during normal operation.

FIGS. 3A through 3C are enlarged waveform charts of a partial section of FIG. 2B.

FIGS. 4A through 4C are waveform charts illustrating example signal waveforms during overcurrent of the power supply device of the past.

FIGS. 5A through 5G are enlarged waveform charts of a partial section of FIG. 4B.

FIG. 8 is a flowchart to illustrate overcurrent protective operation during abnormal operation according to an example embodiment of the present disclosure.

DETAILED DESCRIPTION

It should be noted that the embodiments described below are preferred specific examples of the present disclosure, and although various technically preferred limitations are imparted, the scope of embodiments of the present disclosure is not limited to these example embodiments as long as there is no particular description of limiting an embodiment of the present disclosure in the following description.

Figure 1:
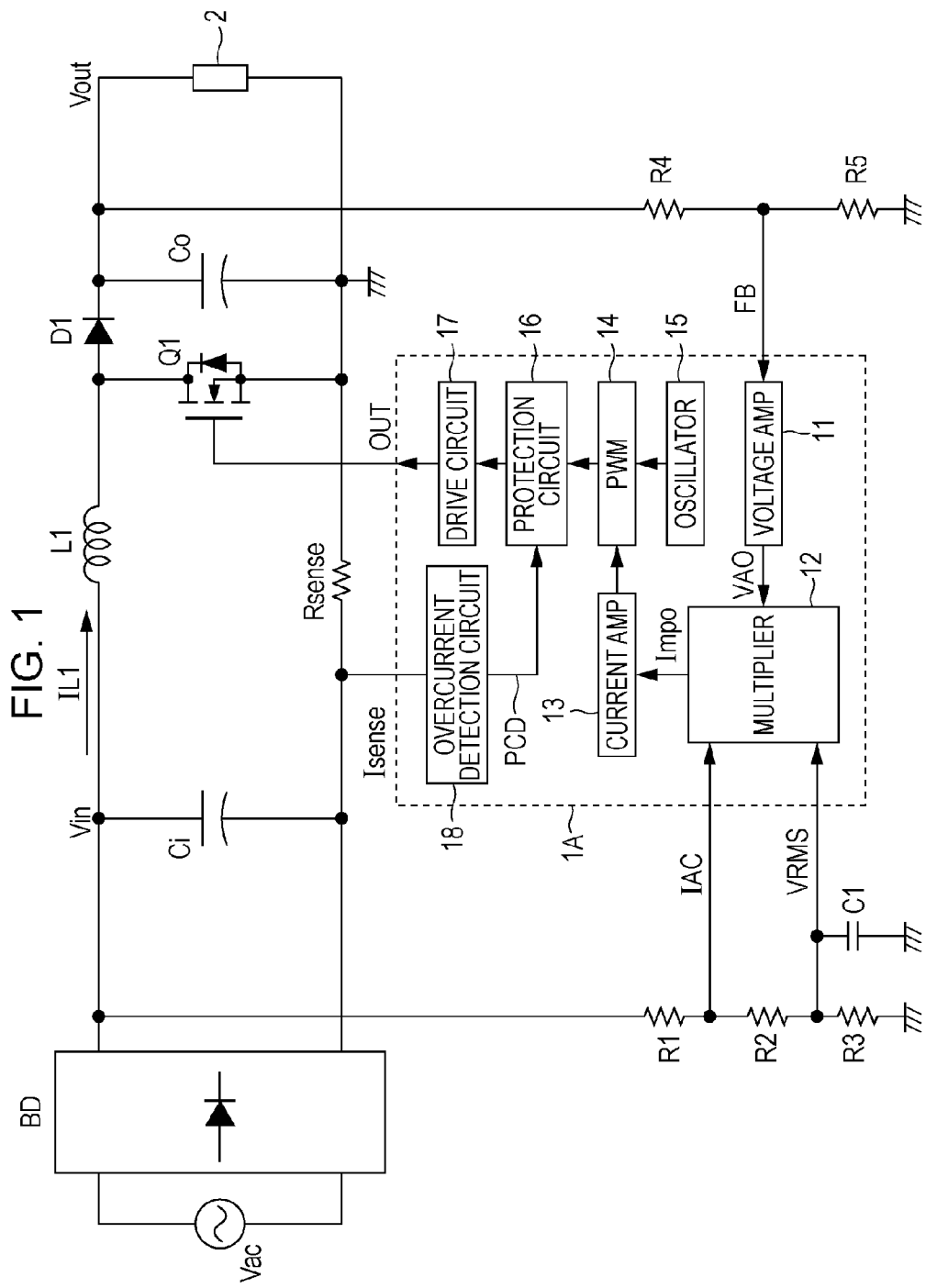
FIG. 1 is a connection diagram illustrating an example of a power supply device of the past to which an embodiment of the present disclosure is applicable.

In order to facilitate understanding embodiments of the present disclosure, a description is given to one example of a power supply device having a PFC control circuit of a continuous current mode of the past to which an embodiment of the present disclosure is applicable with reference to FIG. 1. The continuous current mode is to control a switching element to be turned on/off with a drive pulse. A discontinuous current mode (called as a critical mode) is to detect zero current with a secondary winding provided in a choke coil and switch on/off of the switching element at zero current.

As illustrated in FIG. 1, a bridge rectifying circuit BD and a smoothing capacitor Ci rectify an alternating current voltage of an input alternating current power supply (e.g., commercial power supply) Vac to supply a full-wave rectified voltage to the smoothing capacitor Ci. An input (direct current) voltage Vin is outputted to both ends of the smoothing capacitor Ci.

The input voltage Vin formed by the bridge rectifying circuit BD is connected to a reference potential (e.g., ground) via resistors R1, R2, and R3 in series. A full-wave rectified output current IAC of the bridge rectifying circuit BD is inputted from a connection point of the resistors R1 and R2 to a PFC control circuit 1A. A voltage VRMS (root mean square) of averaged direct current voltages is taken out of a connection point of the resistors R2 and R3, and the voltage VRMS is inputted to the PFC control circuit 1A.

One of input terminals connected to an output terminal (ungrounded side) of the bridge rectifying circuit BD is connected to one end of a choke coil L1, and the other end of the choke coil L1 is connected to one of output terminals via a diode D1. Between the other output terminal and a connection point of the diode D1 and the other end of the choke coil L1, a drain of an FET (field effect transistor) Q1 as a switching element is connected. The FET Q1 is, for example, an N channel FET. A source of the FET Q1 is grounded. Between the drain and the source of the FET Q1, there is a parasitic diode. To a gate of the FET Q1, a drive pulse OUT formed by the PFC control circuit 1A is supplied.

The drain of the FET Q1 is connected to one end of a capacitor Co via the diode D1 in a forward direction. The other end of the capacitor Co is grounded. An output voltage Vout occurs across both ends of the capacitor Co. The output voltage Vout is applied to a load 2. A current sensing resistor Rsense is inserted into a path of a load current in series. A voltage at both ends of the current sensing resistor Rsense is a magnitude corresponding to the current that flows therein, and a detected signal Isense obtained by the current sensing resistor Rsense is supplied to an overcurrent detection circuit

18 of the PFC control circuit 1A. A detected output PCD of the overcurrent detection circuit 18 is supplied to a protection circuit 16.

A booster converter is configured, and an output voltage Vout higher than the input voltage Vin is formed. The drive pulse OUT is supplied from a drive circuit 17 of the PFC control circuit 1A to the FET Q1 as a switching element. The FET Q1 is turned on during a high level (represented as H below) period of a logical value of the drive pulse OUT and is turned off during a low level (represented as L below) period of the logical value.

During the period in which the FET Q1 is turned on, a current flows via the choke coil L1 and the FET Q1. As the FET Q1 is turned off, a current then flows via the choke coil L1, the diode D1, and the capacitor Co.

Between the firstly mentioned output terminal and a reference potential point (e.g., ground), resistors R4 and R5 are inserted in series. A voltage FB into which the output voltage Vout is divided with a resistor is fed back from a connection point of the resistors R4 and R5 to a voltage amplifier 11 of the PFC control circuit 1A.

The PFC control circuit 1A has the voltage amplifier 11, a multiplier 12, a current amplifier 13, a pulse width modulation (PWM) circuit 14, an oscillator 15, the protection circuit 16, the drive circuit 17, and the overcurrent detection circuit 18.

An output voltage FB fed back from a connection point of the resistors R4 and R5 is supplied to the voltage amplifier 11, and an output voltage VAO of the voltage amplifier 11 is inputted to the multiplier 12. Together with the voltage VAO, the current IAC and the voltage VRMS are inputted to the multiplier 12, and a multiplier output Impo is outputted from the multiplier 12. The multiplier output Impo is expressed by the following expression.

$$Impo = IAC \times VAO / (K \times VRMS^2)$$

In the expression, K denotes a constant, which is selected optionally by the circuit.

The multiplier output Impo is supplied to the pulse width modulation circuit 14 via the current amplifier 13. The oscillator 15 has a configuration of generating triangular waves by charging and discharging the capacitor by a current source. The pulse width modulation circuit 14 converts a triangular wave supplied from the oscillator 15 into a pulse signal and modulates the pulse width of the pulse signal in accordance with the multiplier output Impo from the current amplifier 13. The modulated pulse signal is outputted as a drive pulse via the protection circuit 16 and the drive circuit 17. The drive pulse is applied to the gate of the FET Q1. This causes high speed switching of the FET Q1. The PFC control circuit 1A stabilizes the output voltage Vout by varying a duty ratio of the drive pulse.

The multiplier output Impo of the PFC control circuit 1A is, as shown in the above expression, proportional to IAC and VAO and is inverse proportional to a square of VRMS. The greater the multiplier output Impo is, the longer the ON period of the drive pulse. Accordingly, when the voltage VRMS is less, the multiplier output Impo becomes greater and the ON period of the FET Q1 becomes longer, and a current IL1 is controlled to be greater.

The output PCD of the overcurrent detection circuit 18 is supplied within the PFC control circuit 1A, and in a case of detecting an overcurrent (current at a preset value or higher), the output of the drive pulse is stopped by the protection circuit 16. As a result, the FET Q1 is turned off and the excessive current is switched by the FET Q1, and thereby the FET Q1 is prevented from being damaged. Further, the protection circuit 16 is provided with a maximum duty detection circuit, and when the duty ratio becomes very large, the output of the drive pulse is stopped.

FIGS. 2A through 2C illustrate example waveforms in some parts of the power supply device in the past during normal operation. FIG. 2A is a waveform of the input alternating current (AC) current. FIG. 2B is a waveform of the current IL1 flowing in the choke coil L1. FIG. 2C is a waveform of the detected signal Isense. FIGS. 3A through 3C illustrate enlarged waveforms in the section surrounded by the broken lines in FIG. 2B.

FIG. 3A is a waveform of the current IL1 flowing in the choke coil L1. FIG. 3B is a waveform of the detected signal Isense. FIG. 3C is a waveform of the drive pulse OUT outputted from the drive circuit 17. The FET Q1 is turned on during the H period of the drive pulse OUT and the current IL1 of the choke coil L1 flows.

The AC current is controlled to become similar to the AC voltage by varying the duty ratio of ON/OFF of the FET Q1, which is a switching element, using the multiplier output Impo. The choke coil L1 operates to charge energy while the switching element Q1 is turned on and discharge energy while the FET Q1 is turned off.

The drive pulse OUT (that is, the frequency of the oscillator 15) has a fixed frequency. Accordingly, while the load is heavy, as illustrated in FIGS. 3A through 3C, the FET Q1 is turned on again before the energy stored in the choke coil L1 while the FET Q1 is turned on is fully discharged while the FET Q1 is turned off (that is, before the current in L1 becomes zero). Such operation is called as a continuous current mode.

Next, FIGS. 4A through 4C and FIGS. 5A through 5G illustrate example waveforms in some parts during an overcurrent flows. FIGS. 4A through 4C correspond to FIGS. 2A through 2C. FIG. 4A is a waveform of the input alternating current (AC) current. FIG. 4B is a waveform of the current IL1 flowing in the choke coil L1. FIG. 4C is a waveform of the detected signal Isense. FIGS. 5A through 5G illustrate enlarged waveforms in the section surrounded by the broken lines in FIG. 4B. FIGS. 5A through 5G are waveform charts corresponding to FIGS. 3A through 3C.

FIG. 5A is a waveform of an output signal CLK of the oscillator 15. FIG. 5B is a waveform of the current IL1 flowing in the choke coil L1. FIG. 5C is a waveform of the detected signal Isense. FIG. 5D is a waveform of the drive pulse OUT outputted from the drive circuit 17. The FET Q1 is turned on during the H period of the drive pulse OUT and the current IL1 of the choke coil L1 flows. It should be noted that FIGS. 4A through 4C and FIGS. 5A through 5G illustrate schematic waveforms from which noises and the like occurring in reality are omitted.

When the FET Q1 is turned on and an overcurrent flows in the FET Q1, there is a possibility of damaging the FET Q1. The output PCD of the overcurrent detection circuit 18 is supplied to the protection circuit 16 to let the protective operation work when an overcurrent is detected. Generally, as a method of controlling overcurrent, there is a pulse-by-pulse technique that turns off the drive pulse OUT that is being outputted as an overcurrent is detected while the drive pulse OUT is outputted.

In the pulse-by-pulse technique, the output of the drive pulse OUT currently being outputted is turned off immediately by the protection circuit 16 as the overcurrent detection circuit 18 detects that the detected signal Isense has reached a predetermined voltage value. After that, the output of the drive pulse OUT is turned on again at a timing of a fixed frequency period. Further, also in a case that the time period of ON is a predetermined value or more, the protection circuit 16 carries out control (referred to as MAX duty control) to turn off the output of the drive pulse OUT.

FIG. 5E shows a PWM signal that is outputted by the pulse width modulation circuit 14, and FIG. 5F shows the detected signal PCD that is outputted by the overcurrent detection circuit 18. The detected signal PCD becomes H, when the detected signal Isense exceeds a predetermined value, and the output of the drive pulse OUT that is currently being outputted is immediately turned off. When the detected signal Isense becomes not to exceed the predetermined value, the detected signal becomes L. FIG. 5G shows a detected signal MD outputted by a MAX duty detection block provided in the protection circuit 16. The detected signal MD becomes H when the duty ratio reaches a predetermined value, for example, 0.95. When the detected signal MD becomes H, the output of the drive pulse OUT that is currently being outputted is immediately turned off.

Figure 6A:
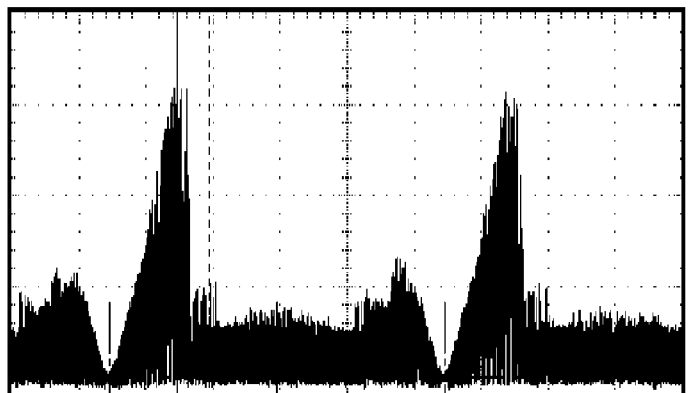
FIGS. 6A through 6C are waveform charts in an example overcurrent condition during abnormal operation.
Figure 6B:
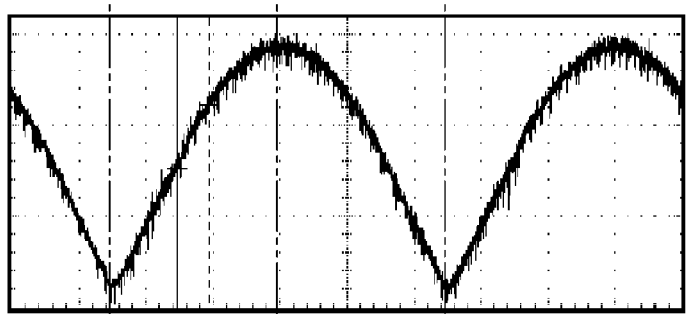
Figure 6C:
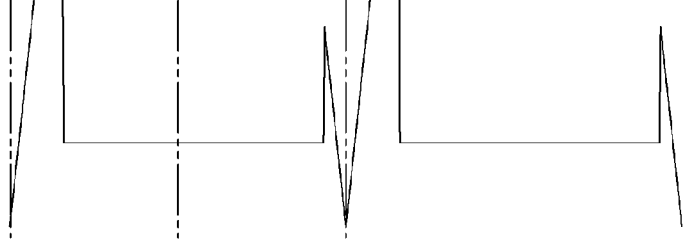

In the configuration of the past, in a case of carrying out an abnormal condition test, the function of limiting overcurrent sometimes does not work. In that case, for example, as illustrated in FIG. 6A, the current IL1 of the choke coil L1 may be overcurrent near a phase angle of from 30° to 40° of the input alternating current voltage (FIG. 6B). FIG. 6C shows peak values of the current IL1. The embodiments of the present disclosure address the issue of an overcurrent in such an abnormal condition.

A description is given below to the configuration of an example embodiment of the present disclosure with reference to FIG. 7. This embodiment is applied to a power supply device having a PFC control circuit of a continuous current mode of the configuration illustrated in FIG. 1 above. That is, an alternating current voltage of an alternating current power supply (e.g., commercial power supply) Vac is rectified by a bridge rectifying circuit BD and a smoothing capacitor Ci, and an input (direct current) voltage Vin occurs at both ends of the smoothing capacitor Ci.

An input voltage Vin is supplied to a booster power supply circuit, including a choke coil L1, an FET Q1, a diode D1, and a capacitor Co, and an output voltage Vout is generated that is higher than the input voltage Vin. The output voltage Vout is supplied to a load 2. The FET Q1 is, for example, an N channel FET. To a gate of the FET Q1 as a switching element, a drive pulse OUT formed by a PFC control circuit 1B is supplied.

The FET Q1 is turned on during an H period, which is one of two logical values, of the pulse and is turned off during an L period, which is the other logical value. During the period of turning on the FET Q1, a current flows via the choke coil L1 and the FET Q1. Then, as the FET Q1 is turned off, a current flows via the choke coil L1, the diode D1, and the capacitor Co.

Figure 7:
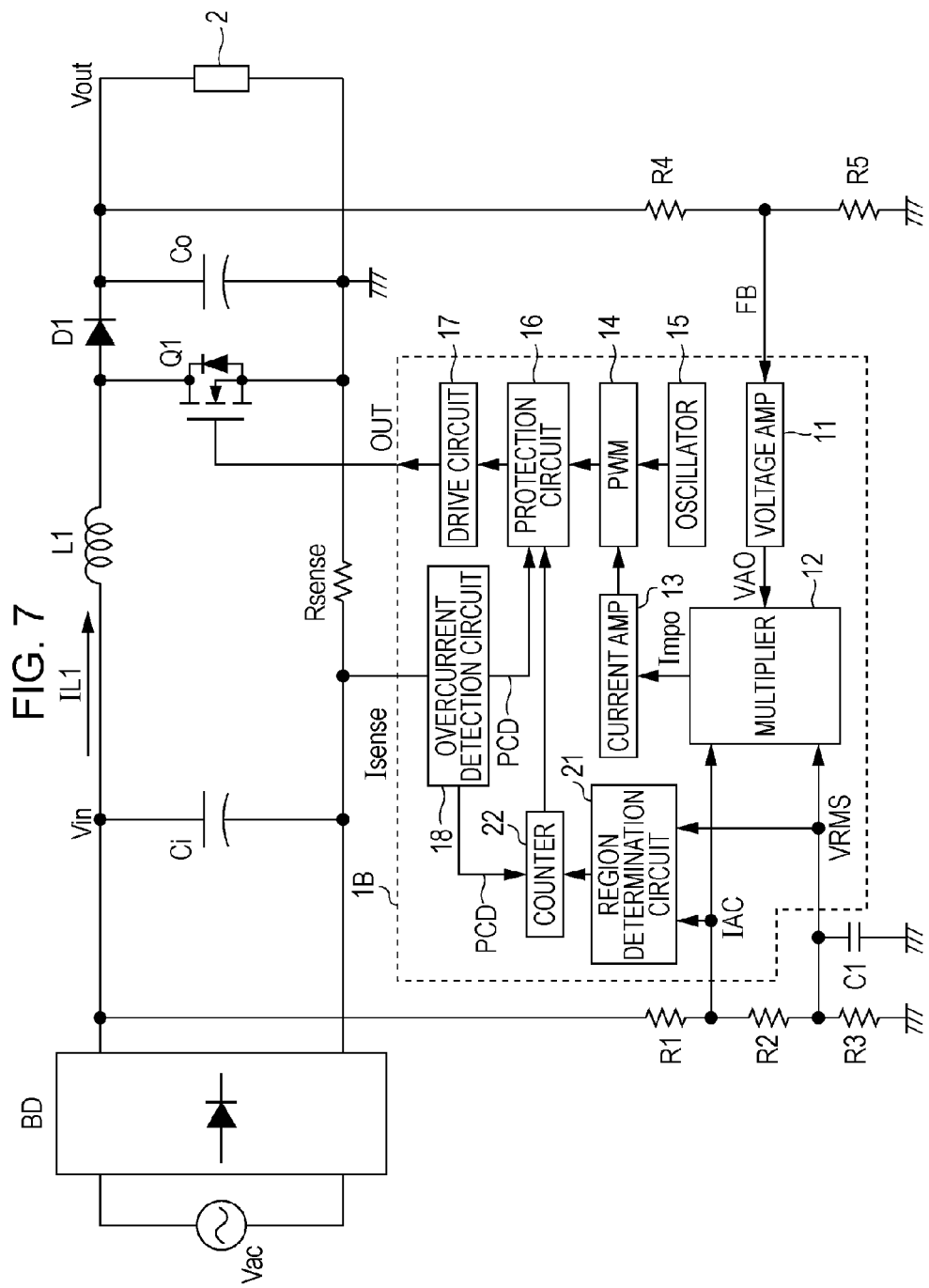
FIG. 7 is a block diagram of a power supply device according to an example embodiment of the present disclosure.

As illustrated in FIG. 7, the PFC control circuit 1B according to this example embodiment has a voltage amplifier 11, a multiplier 12, a current amplifier 13, a pulse width modulation (PWM) circuit 14, an oscillator 15, a protection circuit 16, a drive circuit 17, an overcurrent detection circuit 18, a region determination circuit 21, and a counter 22.

An input current IAC and a voltage VRMS of averaged AC voltages are supplied to the multiplier 12 of the PFC control circuit 1B. A voltage FB into which the output voltage Vout is divided with a resistor is supplied to the voltage amplifier 11 of the PFC control circuit 1B, and an output voltage VAO of the voltage amplifier 11 is supplied to the multiplier 12.

The multiplier 12 supplies a multiplier output Impo expressed by the following expression to the pulse width modulation circuit 14 via the current amplifier 13.

$$Impo = IAC \times VAO / (K \times VRMS^2)$$

In the expression, K denotes a constant, which is selected optionally by the circuit.

The pulse width modulation circuit 14 modulates the pulse width of the signal supplied from the oscillator 15 in accordance with an output CAO from the current amplifier 13. The modulated pulse signal is outputted as a drive pulse OUT via the protection circuit 16 and the drive circuit 17. The drive pulse OUT is applied to the gate of the FET Q1. This causes high speed switching of the FET Q1.

The multiplier output Impo is, as shown in the above expression, proportional to IAC and VAO and is inverse proportional to a square of VRMS. The greater the multiplier output Impo is, the longer the ON period of the drive pulse. Accordingly, when the voltage VRMS is less, the multiplier output Impo becomes greater and the ON period of the FET Q1 becomes longer, and a current IL1 is controlled to be greater. The PFC control circuit 1B stabilizes the output voltage Vout by varying a duty ratio of the drive pulse.

A current sensing resistor Rsense is inserted into a path of the load current in series. A detected signal (voltage value) Isense obtained by the current sensing resistor Rsense is supplied to the overcurrent detection circuit 18 of the PFC control circuit 1B. A detected output PCD of the overcurrent detection circuit 18 is supplied to the protection circuit 16. In a case of detecting an overcurrent, the output of the drive pulse is stopped by the protection circuit 16. As a result, the FET Q1 is turned off and the overcurrent is suppressed. The protective operation is protective operation similar to that of the power supply circuit in the past described above, and is normal overcurrent protective operation. In the normal overcurrent protective operation, when the detected output PCD of the overcurrent detection circuit 18 becomes L, the stoppage of the output of the drive pulse is removed. That is, protective operation is carried out by a pulse-by-pulse technique.

Figure 9A:
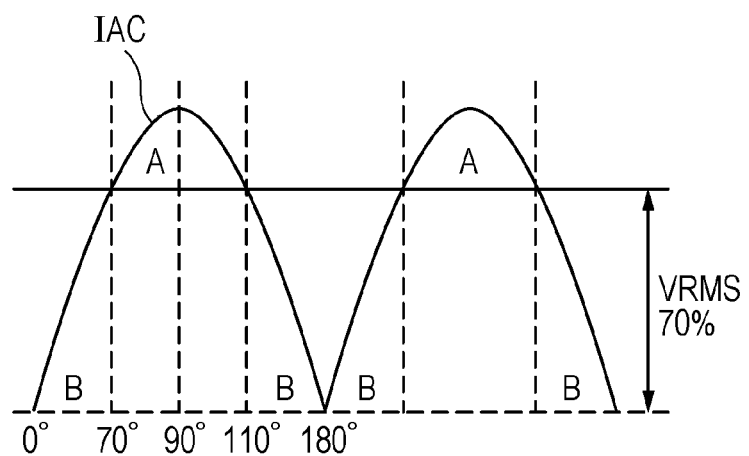
FIGS. 9A and 9B are waveform charts to illustrate region determination operation in an example embodiment of the present disclosure.
Figure 9B:
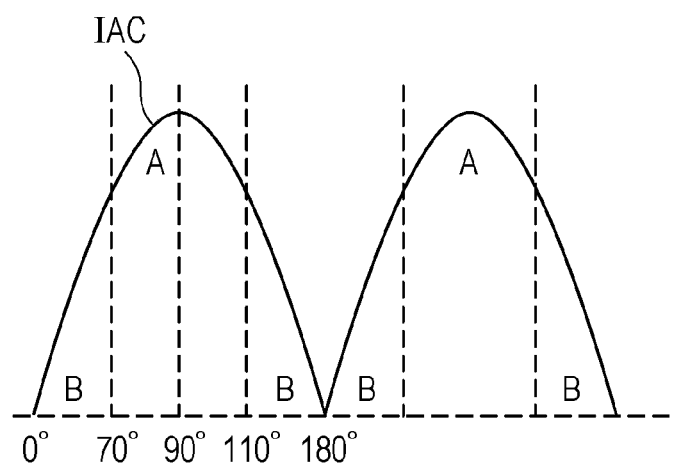

As illustrated in FIG. 9A, a predetermined region (range) within phase angles of from 0° to 180°, for example regions (ranges) of phase angles of 0° to 70° and 110° to 180°, of a full-wave waveform of the input alternating current voltage is detected by the region determination circuit 21. For example, the input alternating current IAC is compared with a value (threshold) corresponding to the voltage VRMS of averaged direct current voltages. The regions of the input alternating current voltage below the threshold are referred to as regions B and other regions as regions A. The established regions B are preferably established within ranges of 0° to 80° and 100° to 180°, for example. As illustrated in FIG. 9B, the region determination may also be carried out by detecting phases of the input alternating current IAC.

The detected signal of the region determination circuit 21 is supplied to the counter 22 as a count enable signal. For example, as the region determination circuit 21 outputs determination as H in the region B, the counter 22 is enabled to count the detected signal PCD of the overcurrent detection circuit 18 in the region B. In the other regions A, the counter 22 is controlled not to carry out counting operation.

The count output of the counter 22 is supplied to the protection circuit 16. In the protection circuit 16, as described later, whether or not overcurrent protective operation in an abnormal condition is desired is determined by processing the count output. When the overcurrent protective operation in an abnormal condition is determined as desired, the output of the drive pulse is stopped. The overcurrent protective operation in an abnormal condition is different from the pulse-by-pulse technique and is continued, once activated, until resetting operation. The resetting operation is done by, for example, plugging an AC plug out of an outlet.

In this embodiment of the present disclosure, the normal operation is similar to that of the power supply device of the past. A description is given to the overcurrent protective operation during abnormal operation with reference to the flowchart in FIG. 8. In step S1, the region determination circuit 21 determines whether or not it is the region B. When it is determined as the region B, the counter 22 counts the detected output PCD of the overcurrent detection circuit 18 (step S2).

In step S3, the result of the counting operation (count value) in the region B is processed. In step S4, whether or not the result of the counting operation satisfies a condition to carry out the overcurrent protective operation during abnormal operation is determined. When the condition to carry out the overcurrent protective operation during abnormal operation is determined to be fulfilled, the overcurrent protective operation during abnormal operation is done in step S5. As described above, the output of the drive pulse is inhibited and the condition of inhibiting the output of the pulse signal is continued until reset.

A description is given below to specific examples of the condition to carry out the overcurrent protective operation during abnormal operation:

Condition 1: a case of detecting continuously m times of an AC half-wave (0° to)180° period of generating an n number of continuous overcurrent detected output(s) PCD in the region B;

Condition 2: a case of detecting continuously m times of an AC half-wave period of generating an n number of overcurrent detected output(s) PCD in the region B;

Condition 3: a case of detecting m times in o times of an AC half-wave period of generating an n number of continuous overcurrent detected output(s) PCD in the region B;

Condition 4: a case of detecting m times in o times of an AC half-wave period of generating an n number of overcurrent detected output(s) PCD in the region B;

where (n, m≧1, o≧m) is fulfilled in the conditions 1 through 4.

Condition 5: a case of a count value reaching m by counting up (+1 of the count value) as generating an n number of continuous overcurrent detected output(s) PCD in the region B; and Condition 6: a case of a count value reaching m by counting up (+1 of the count value) as generating an n number of overcurrent detected output(s) PCD in the region B;

where (n, m≧1) is fulfilled in the conditions 5 and 6.

Any of the conditions 1 through 6 is established.

Further, a reset of the counter 22 or countdown of the counter 22 may also be added to each condition described above. Examples of such a reset are shown below.

Resetting Operation 1: the counter is reset in a case of detecting m times of continuous AC half-wave period(s) of generating an n number or less of continuous overcurrent detected output(s) PCD in the region B.

Resetting Operation 2: the counter is reset in a case of detecting m times of continuous AC half-wave period(s) of generating an n number or less of overcurrent detected output(s) PCD in the region B.

Resetting Operation 3: the counter is reset in a case of detecting m times in o times of AC half-wave period(s) of generating an n number or less of continuous overcurrent detected output(s) PCD in the region B.

Resetting Operation 4: the counter is reset in a case of detecting m times in o times of AC half-wave period(s) of generating an n number or less of overcurrent detected output(s) PCD in the region B.

In the resetting operations 1 through 4, (n, m≧1, o≧m) is fulfilled.

Examples of countdown are shown below. Countdown is operation for −1 of a count value.\

Countdown Operation 1: the counter is counted down in a case of detecting m times of continuous AC half-wave period(s) of generating an n number or less of continuous overcurrent detected output(s) PCD in the region B.

Countdown Operation 2: the counter is counted down in a case of detecting m times of continuous AC half-wave period(s) of generating an n number or less of overcurrent detected output(s) PCD in the region B.

Countdown Operation 3: the counter is counted down in a case of detecting m times in o times of generating AC half-wave period(s) of an n number or less of continuous overcurrent detected output(s) PCD in the region B.

Countdown Operation 4: the counter is counted down in a case of detecting m times in o times of AC half-wave period(s) of generating an n number or less of overcurrent detected output(s) PCD in the region B.

In countdown operations 1 through 4, (n, m≧1, o≧m) is fulfilled.

Figure 10A:
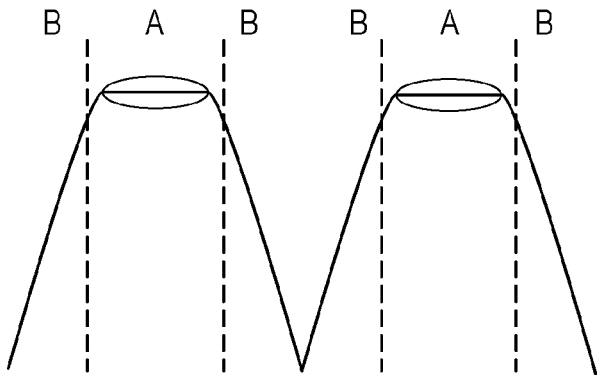
FIGS. 10A through 10C are waveform charts to illustrate overcurrent protective operation of an example embodiment of the present disclosure.
Figure 10B:
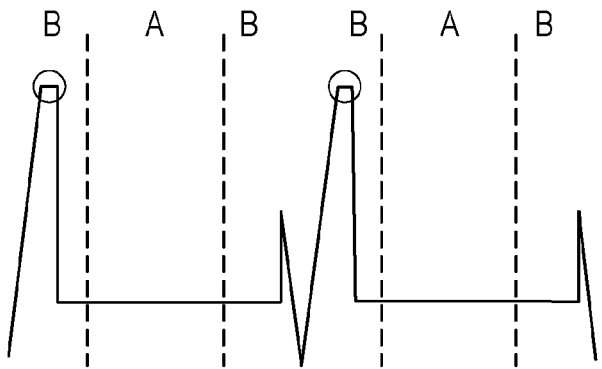
Figure 10C:
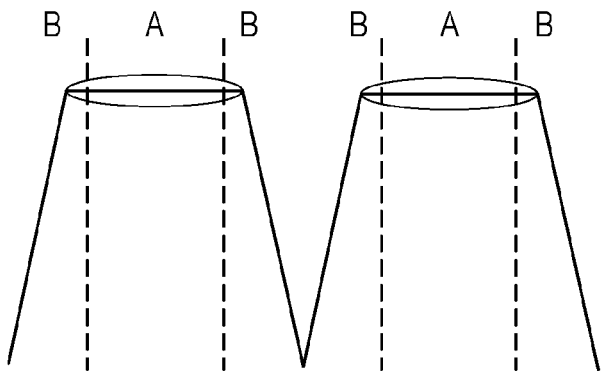

In a case of a normal overcurrent condition occurring due to load variation, reduction of the alternating current input voltage, or the like within expectations, current limiting protective operation is carried out in regions surrounded by lines in the region A in FIG. 10A. The protective operation is a pulse-by-pulse technique. In a case of occurring an overcurrent condition during abnormal operation due to abnormal testing or the like, current limiting protective operation is carried out in regions surrounded by lines in the regions B in FIG. 10B. The protective operation is a latch system, which does not return once operated unless cutting off the power supply. Further, as illustrated in FIG. 10C, in a case of occurring larger load variation than the expected load variation, the overcurrent protective operation is carried out also in the regions B. The overcurrent protective operation during abnormal operation is carried out also for such load variation beyond expectations.

Although the example embodiments of the present disclosure are described above specifically, embodiments of the present disclosure are not limited to the embodiments described above and various modifications are possible based on the technical spirit of the present disclosure. For example, although the current sensing resistor Rsense is used for current detection, a current may also be detected using a current detection transformer. Further, a current may also be detected by adding a secondary winding to the choke coil. Further, since the zero current detection is expected to detect completion of discharging the choke coil L1, it is not limited to a detected value of 0 V (volt).

Further, the conditions described above to activate the overcurrent protective operation during abnormal operation are examples and other settings are also possible. Further, embodiments of the present disclosure are also applicable to PFC control of a discontinuous current mode (critical mode).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A power supply apparatus for converting an alternating current to a direct current, comprising:
   a conversion component outputting a variable first voltage, the first voltage causing a first current, the first current having a predetermined phase region defined by at least one phase angle range of a waveform of the first current;
   a region determination circuit receiving both the first current and an average of the first voltage to determine whether the first current is in the predetermined phase region;
   an output component operably coupled to the conversion component, the output component outputting a load voltage;
   a sense component operably coupled to the conversion component, the sense component sensing a value indicative of a second current; and
   a switch element operably coupled to the conversion component, the switch element having a first state and a second state;
   wherein the switch element allows current to flow through the switch element in the first state and impedes current from flowing through the switch element in the second state;
   wherein the switch element changes between the first state and the second state based on a switch drive signal;
   wherein the switch drive signal forces the switch into the second state when the first current is determined to be in the predetermined phase region and the value indicative of the second current exceeds a threshold indicative of an overcurrent condition through the switch element.

2. The power supply apparatus of claim 1, wherein the conversion component is a full wave rectifier.

3. The power supply apparatus of claim 1, wherein the predetermined phase region is at least one of 0 to 80 degrees and 100 to 180 degrees.

4. The power supply apparatus of claim 1, wherein the predetermined phase region is at least one of 30 to 40 degrees and 140 to 150 degrees.

5. The power supply apparatus of claim 1, wherein the first current is determined to be in the predetermined phase region by using a ratio of the first current to an average of the first voltage.

6. The power supply apparatus of claim 1, wherein the output component is a capacitor.

7. The power supply apparatus of claim 1, wherein the switch element is a field effect transistor.

8. The power supply apparatus of claim 1, wherein the sense component is a resistor and the second current flows only through the switch element and the sense component when the switch element is in the first state.

9. The power supply apparatus of claim 1, further comprising an alternating current voltage source operably coupled to the conversion component.

10. The power supply apparatus of claim 1, further comprising a load device which receives the load voltage from the output component.

11. The power supply apparatus of claim 10, wherein the load device is at least one of a laptop computer, a mobile phone, a digital camera, and a tablet computer.

12. A power supply apparatus for converting an alternating current to a direct current, comprising:
    a conversion component outputting a variable first voltage, the first voltage causing a first current, the first current having a predetermined phase region defined by at least one phase angle range of a waveform of the first current;
    a region determination circuit receiving both the first current and an average of the first voltage to determine whether the first current is in the predetermined phase region defined by at least one phase angle range of a waveform of the first current, the region determination circuit producing a phase region signal when the first current is in the predetermined phase region;
    an overcurrent detection circuit sensing a value indicative of a second current and determining whether the value indicative of the second current exceeds a threshold indicative of an overcurrent condition through a switch element, the overcurrent detection circuit producing an overcurrent signal when the second current exceeds the threshold;
    a drive circuit causing the switch element to switch between a first state, which allows current to flow through the switch element, and a second state, which impedes current from flowing through the switch element; and
    a protection circuit operably coupled to the region determination circuit to receive the phase region signal and operably coupled to the overcurrent detection circuit to receive the overcurrent signal, the protection circuit causing the drive circuit to switch the switch element to the second state when the phase region signal and the overcurrent signal indicate that at least one overcurrent condition occurred while the first current was in the predetermined phase region.

13. The power supply apparatus of claim 12, wherein the predetermined phase region is at least one of 0 to 80 degrees and 100 to 180 degrees.

14. The power supply apparatus of claim 12, wherein the predetermined phase region is at least one of 30 to 40 degrees and 140 to 150 degrees.

15. The power supply apparatus of claim 12, further comprising a counter which increments based on detecting a first predetermined number of overcurrent conditions while the first current is in the predetermined phase region during a predetermined number of wave periods.

16. The power supply apparatus of claim 15, wherein the counter is at least one of reset and counted down based on detecting less than a predetermined number of overcurrent conditions while the first current is in the predetermined phase region during the predetermined number of wave periods.

17. The power supply apparatus of claim 12, further comprising a counter which increments based on detecting a first predetermined number of continuous overcurrent conditions while the first current is in the predetermined phase region during a predetermined number of wave periods.

18. The power supply apparatus of claim 17, wherein the counter is at least one of reset and counted down based on detecting less than the predetermined number of continuous overcurrent conditions while the first current is in the predetermined phase region during the predetermined number of wave periods.

19. The power supply apparatus of claim 12, wherein the protection circuit causes the drive circuit to switch the switch element to the second state after receiving a first predetermined number of overcurrent signals while the first current was in the predetermined phase region during a predetermined number of wave periods.

20. The power supply apparatus of claim 12, wherein the protection circuit causes the drive circuit to switch the switch element to the second state after receiving a first predetermined number of overcurrent signals while the first current was in the predetermined phase region during a predetermined number of consecutive wave periods.

21. The power supply apparatus of claim 12, wherein the protection circuit causes the drive circuit to switch the switch element to the second state after receiving a first predetermined number of continuous overcurrent signals while the first current was in the predetermined phase region during a predetermined number of wave periods.

22. The power supply apparatus of claim 12, wherein the protection circuit causes the drive circuit to switch the switch element to the second state after receiving a first predetermined number of continuous overcurrent signals while the first current was in the predetermined phase region during a predetermined number of consecutive wave periods.

23. The power supply apparatus of claim 12, wherein the protection circuit causes the drive circuit to switch the switch element to the second state after receiving at least one of a first predetermined number of overcurrent signals and a predetermined number of continuous overcurrent signals while the first current was in the predetermined phase region during a predetermined number of wave periods of a predetermined number of consecutive wave periods.

24. The power supply apparatus of claim 12, wherein the protection circuit causes the drive circuit to switch the switch element to the second state based on a maximum duty signal for the switch element.

25. The power supply apparatus of claim 12, wherein at least one of the overcurrent signal and the phase region signal is a binary signal.

26. The power supply apparatus of claim 12, wherein the region determination circuit, the overcurrent detection circuit, the drive circuit, and the protection circuit are located on a single integrated circuit.

27. A method for converting an alternating current to a direct current for supplying power, comprising:
    converting an alternating current input into a variable first voltage, the variable first voltage causing a first current, the first current having a predetermined phase region defined by at least one phase angle range of a waveform of the first current, wherein a region determination circuit receives both the first current and an average of the first voltage to determine whether the first current is in the predetermined phase region;
    producing a second voltage based on the first voltage;
    switching a switch element between a first state and a second state;
    sensing a value indicative of a second current caused by the second voltage;
    determining whether the value indicative of the second current exceeds a threshold indicative of an overcurrent condition through the switch element; and
    outputting a load voltage resulting from the second voltage and the switching of the switch element;
    wherein the switch element allows current to flow through the switch element in the first state and impedes current from flowing through the switch element in the second state;
    wherein the switch element changes between the first state and the second state based on a switch drive signal;
    wherein the switch drive signal forces the switch into the second state when the first current is determined to be in the predetermined phase region and the value indicative of the second current exceeds a threshold indicative of an overcurrent condition through the switch element.

28. The method of claim 27, wherein the switch drive signal forces the switch into the second state after a first predetermined number of overcurrent conditions occur when the first current was in the predetermined phase region during a predetermined number of wave periods.

29. The method of claim 27, wherein the second current flows only through the switch element and a resistor when the switch element is in the first state.

30. The method of claim 27, wherein the first current is determined to be in the predetermined phase region by using a ratio of the first current to an average of the first voltage.

31. A method for converting an alternating current to a direct current for supplying power, comprising:
    converting an alternating current input into a variable first voltage;
    receiving a signal indicative of a first current output by a conversion component to determine whether the first current is in a predetermined phase region defined by at least one phase angle range of a waveform of the first current;
    producing a phase region signal when the first current is in the predetermined phase region, wherein a region determination circuit receives both the first current and an average of the first voltage to determine whether the first current is in the predetermined phase region;
    sensing a value indicative of a second current;
    determining whether the value indicative of the second current exceeds a threshold indicative of an overcurrent condition through a switch element;
    producing an overcurrent signal when the second current exceeds the threshold; and
    switching the switch element from a first state, which allows current to flow through the switch element, to a second state, which impedes current from flowing through the switch element, when the phase region signal and the overcurrent signal indicate that at least one overcurrent condition occurred while the first current was in the predetermined phase region.

32. The method of claim 31, further comprising counting overcurrent conditions while the first current is in the predetermined phase region during at least one wave period to determine when to switch the switch element to the second state.

33. The method of claim 31, wherein the first current is determined to be in the predetermined phase region by using a ratio of the first current to an average of the first voltage.

* * * * *